United States Patent
Funami et al.

(10) Patent No.: US 7,092,638 B2
(45) Date of Patent: Aug. 15, 2006

(54) OPTICAL MULTIPLEX COMMUNICATION SYSTEM, OPTICAL TRANSMISSION APPARATUS, AND CONTROL METHOD OF OPTICAL MULTIPLEX COMMUNICATION

(75) Inventors: Yoshihisa Funami, Yokohama (JP); Tetsuo Wada, Kawasaki (JP); Kazumaro Takaiwa, Yokohama (JP); Toshihisa Kyouno, Yokohama (JP); Yasushi Tateno, Yokohama (JP); Yoshiaki Shibayama, Yokohama (JP); Akinori Nishiie, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 702 days.

(21) Appl. No.: 10/269,980

(22) Filed: Oct. 15, 2002

(65) Prior Publication Data

US 2003/0147647 A1 Aug. 7, 2003

(30) Foreign Application Priority Data

Feb. 7, 2002 (JP) .............................. 2002-030313

(51) Int. Cl.
*H04B 10/00* (2006.01)

(52) U.S. Cl. ........................ 398/158; 398/79; 398/91; 398/93; 398/94; 398/95; 398/25; 398/26; 398/27; 398/33; 398/34; 398/38; 398/159; 398/140; 398/141; 398/160; 398/162; 398/182; 398/192; 398/195; 398/196; 398/197; 398/202; 398/208; 398/209

(58) Field of Classification Search .................. 398/82, 398/94, 140–181, 5, 79, 91, 93, 95, 25, 26, 398/27, 33, 34, 38, 182, 192, 195, 196, 197, 398/202, 208, 209; 359/145

See application file for complete search history.

(56) References Cited

U.S. PATENT DOCUMENTS 6,839,518 B1 * 1/2005 Minamimoto et al. ........ 398/94

FOREIGN PATENT DOCUMENTS

| JP | 6-69891 | 3/1994 |
| JP | 8-195733 | 7/1996 |
| JP | 2001-053682 | 5/2001 |

* cited by examiner

*Primary Examiner*—Hanh Phan
(74) *Attorney, Agent, or Firm*—Staas & Halsey LLP (57) ABSTRACT

An optical multiplex communication system includes a transmission part and a receiving part, wherein the transmission part includes a transmission quality detecting part which measures and transmits a transmission quality information for the channels based on a request from the transmission part; the receiving part includes a variable optical attenuation part controls the optical signal level for the channels, an optical level setting part controls the variable optical attenuation part based on a setting value, a setting control part adding the setting value to the optical level setting part based on a request for setting.

17 Claims, 9 Drawing Sheets

OPTICAL MULTIPLEX COMMUNICATION SYSTEM, OPTICAL TRANSMISSION APPARATUS, AND CONTROL METHOD OF OPTICAL MULTIPLEX COMMUNICATION

BACKGROUND OF THE INVENTION

1. Field of the Invention

The present invention relates to an optical multiplex communication system and an optical transmission apparatus having a transmission part and a receiving part, and a control method of optical multiplex communication by which multiplexed optical signals are controlled to be transmitted stably.

2. Description of the Related Art

A wavelength division multiplexing (WDM) transmission method is known as a transmission means for transmitting a large amount of information at a high speed. In the WDM transmission method, the optical signals having different wavelengths are respectively assigned to a plurality of channels, so that the optical signals are multiplexed and transmitted to one optical transmission path. In this case, at a transmission part, the optical signals having different wavelengths are multiplexed, amplified by an optical amplifier such as an Er doped optical fiber, and then transmitted to the optical transmission path. A relay amplifier or an end amplifier consists of an optical amplifier similar to the above mentioned amplifier so that the optical signal is amplified. The optical signals that are multiplexed are de-multiplexed for respective channels so that the receiving process is implemented at the receiving part.

The optical amplifier amplifying the optical signal that is multiplexed generally has an ALC structure in which a feedback control is implemented so that an amplified output optical level has a designated value. In this case, it is necessary to demultiplex the optical signal level for respective channels having designated levels. Hence, the optical amplifier is controlled for the number of channel. In a case where the optical signal that is multiplexed is amplified and transmitted, an optical signal level of other channel changes based on an increase/decrease of the number of channels or a change of the optical signal level of one channel.

With respect to a received optical signal of the receiving part, which is influenced by the transmission property of the optical signal that is multiplexed, including the optical amplifier and the optical transmission path, a means for adjusting the optical signal power of respective channels at a receiving side so that the respective optical signal power of the respective channels become the same is known. See the Japanese Laid-Open Patent Application No. 6-69891.

In addition, a multiplex optical communication system, in which an optical amplifier amplifying the optical signal that is multiplexed is controlled based on a change of the number of channels so that the respective optical signal power of the respective channels at the receiving part becomes the same and the control process is made smooth, is known. See the Japanese Laid-Open,Patent Application No. 8-195733.

Furthermore, a system, in which variations in the number of channels are detected and the time needed to control an optical amplifier and the time needed to input a multiplexed optical signals having the channel number varied to the optical amplifier are adjusted so as to reduce variations of optical signal power of respective channels at a receiving part, is known. See the Japanese Laid-Open Patent Application No. 2001-53682.

At the receiving part of the optical multiplex communication system in which the optical signals having different wavelengths are respectively assigned to a plurality of channels and multiplexed so as to be amplified and transmitted, it is necessary that the optical signal levels of respective channels have more than designated values in order to reduce an error of the receiving process. Hence, transmission quality information such as the optical signal level for respective channels at the receiving part or an error ratio is provided to the receiving part. Furthermore, a means for controlling the optical signal levels that are multiplexed for respective channels based on the transmission quality information from the receiving part can be applied to the receiving part.

However, in a case where the transmission quality information for respective channels is provided from the receiving part to the transmission part, there is a problem. That is, a control of the optical signal levels for respective channels at the receiving part based on the above mentioned transmission quality information may be delayed at a path for the above mentioned control. Because of this, the optical signal levels that are multiplexed may change greatly so that the optical signal levels of other channels are influenced and the whole of the transmission quality may decline. Furthermore, in a case where the optical signal levels for respective channels becomes large wholly and the input power of the optitcal amplifier of the transmission part increases, if the optical signal levels for respective channels are reduced evenly, the transmission qualities of all of the channels are reduced. Because of this, level controls against the optical signal of the respective signals based on the transmission quality occur frequently so that an automatic level control at the optical amplifier becomes unstable and time for convergence becomes long. As a result of this, the change of the qualities of respective channels may occur.

SUMMARY OF THE INVENTION

Accordingly, it is a general object of the present invention to provide a novel and useful optical multiplex communication system, an optical transmission apparatus, and a control method of optical multiplex communication, in which one or more of the problems described above are eliminated.

Another and more specific object of the present invention is to provide a stable optical multiplex communication irrespective of increase/decrease of the number of the channels and the change of the optical signal level for respective channels.

The above objects of the present invention are achieved by an optical multiplex communication system comprising a transmission part and a receiving part, wherein optical signals having different wavelengths and respectively assigned to a plurality of channels are multiplexed so as to make multiplexed signals, and then amplified with an optical amplifier and transmitted to an optical transmission path, by the transmission part; the multiplexed optical signals are received through the optical transmission path and then amplified with another optical amplifier and de-multiplexed for respective channels so that a receiving process is implemented by the receiving part; the receiving part includes a transmission quality detecting part that measures and transmits transmission quality information for the channels based on a request from the transmission part; the transmission part includes a variable optical attenuation part controlling the optical signal level for the channels, an optical level setting part controlling the variable optical attenuation part based on a setting value, a setting control part adding the setting value to the optical level setting part based on a request for setting, and a setting protection part transmitting the request for setting to the setting control part; and the setting protection part sets a protection step number with respect to a state transition transmitting the request for setting so as to make the transmission quality information be in a target range of the transmission quality.

The above objects of the present invention are also achieved by an optical transmission device in which optical signals having a different plurality of wave lengths are multiplexed, amplified by an optical amplifier having an output level stability function, and transmitted, including a setting control part that level-controls respective un-multiplexed optical signal having the plurality of wave length corresponding to the transmission quality at every the plurality of the wave lengths as a result of measuring of a receiving device that receives the optical signal, and controls to decrease the level of the un-multiplexed optical signals having the plurality of wave length in a case where the input level of the optical amplifier exceeds the designated level, and a setting protection part that controls so as to prevent the setting control part from level-controlling based on the transmission quality.

The above objects of the present invention are also achieved by a control method of optical multiplex communication, wherein a multiplexed optical signal is transmitted between a transmission part and a receiving part; optical signals having different wavelengths and respectively assigned to a plurality of channels are multiplexed by controlling an optical signal level corresponding to the channel with a variable optical attenuation part so as to make the multiplexed signals, and then amplified with an optical amplifier and transmitted to an optical transmission path, by a transmission part; the multiplexed optical signals are received through the optical transmission path and then amplified with another optical amplifier and de-multiplexed for respective channels so that transmission quality for the channels is detected with the transmission quality detecting part, by a receiving part, including the steps of: a) receiving the transmission quality information corresponding to the channels from the transmission quality detecting part of the receiving part by a setting protection part of the transmitting part, and b) transitioning a state corresponding to a step number of the protection between a setting state in which the setting of the amount of the attenuation of the variable optical attenuation part is changed and a setting completing state in which the setting is completed based on a result of a decision of whether or not the transmission quality information is in a target range of the transmission quality.

DETAILED DESCRIPTION OF THE PREFERRED EMBODIMENTS

A description will now be given, with reference to the drawings, of the present invention.

Figure 1:
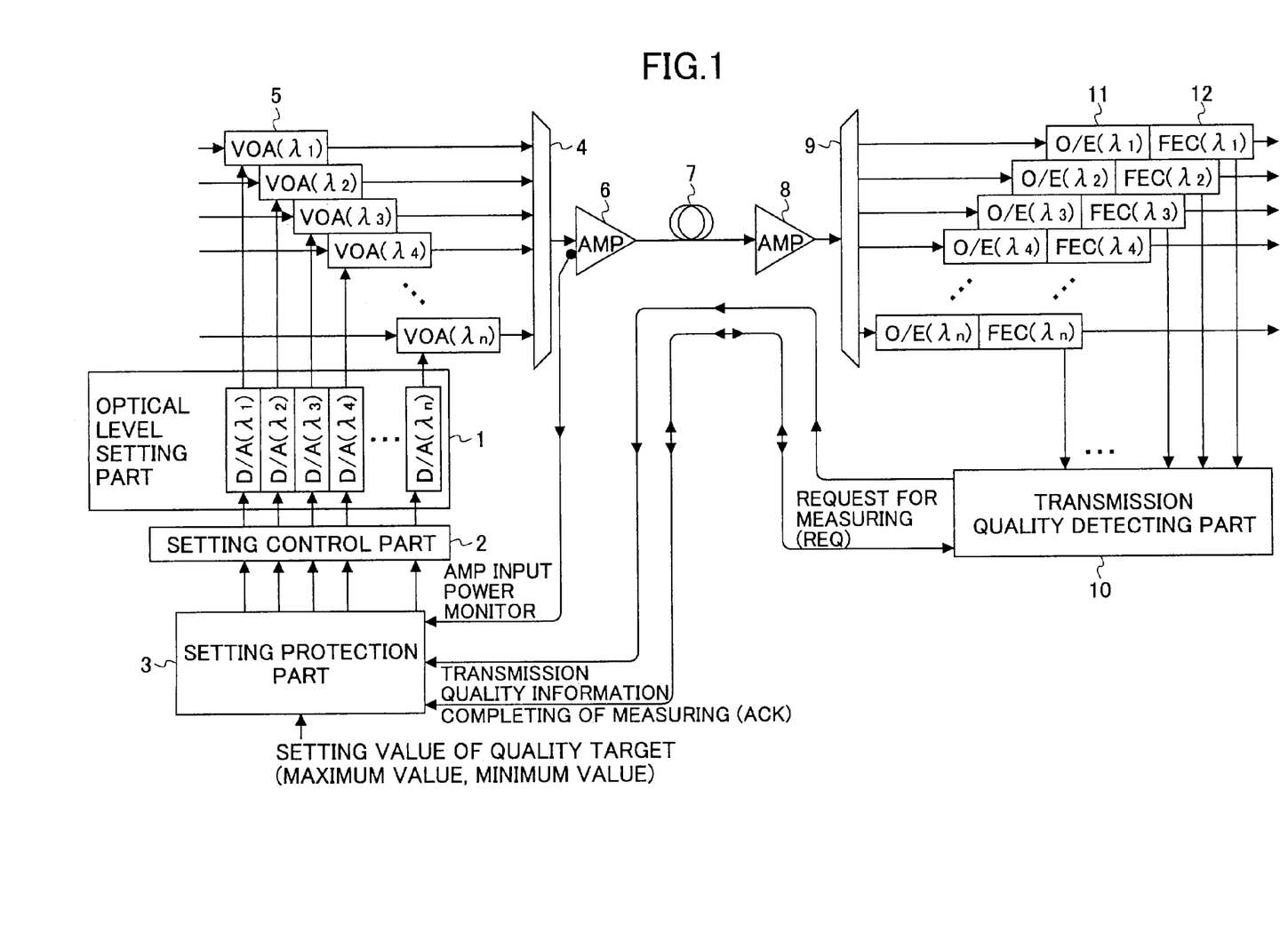
FIG. 1 is a view for explaining the embodiment of the present invention.

FIG. 1 is a view for explaining the embodiment of the present invention. An optical level setting part including a DA converter ($D/A(\lambda_1)$–$D/A(\lambda_n)$) is numbered 1, a setting control part is numbered 2, a setting protection part is numbered 3, an optical multiplexing part is numbered 4, a variable optical attenuation part ($VOA(\lambda_1)$–$VOA(\lambda_n)$) is numbered 5, an optical amplifier (AMP) is numbered 6, an optical transmission path is numbered 7, an optical amplifier (AMP) is numbered 8, an optical multiplex separation part is numbered 9, a transmission quality detecting part is numbered 10, an opto-electric conversion part ($O/E(\lambda_1)$–$O/E(\lambda_n)$) is numbered 11, and an error detect correction part for respective channels ($FEC(\lambda_1)$–$FEC(\lambda_n)$) is numbered 12. The DA converter of the optical level setting part 1, the variable optical attenuation part 5, the opto-electric conversion part 11, and the error detect correction part 12 comprise a structure for channels, namely wave lengths $\lambda_1$–$\lambda_n$.

A transmitting part (optical transmitting device) and a receiving part (optical receiving device) are connected by the optical transmission path 7. A multiplexed optical signal that is amplified by the optical amplifier 6 at a side of the receiving part is transmitted to the optical transmission path 7.

In the case of a long distance transmission, the multiplexed optical signal is amplified by an optical relay amplifier not shown in FIG. 1. In this case, the multiplexed optical signal is amplified by the optical amplifier 8 at a side of the receiving part and de-multiplexed for respective channels so that a receiving process is implemented.

For example, an optical amplifier having an Er doped optical fiber is used as the optical amplifiers 6 and 8. Each of the optical amplifiers 6 and 8 has a structure of an automatic level control (ALC) by a feedback path not shown in FIG. 1 so that each of the optical amplifiers 6 and 8 has an amplified optical signal level for respective channels.

The transmitting part, namely the optical transmitting device, includes the optical level setting part 1, the setting control part 2, the setting protection part 3, the optical multiplexing part 4, the variable optical attenuation part 5, and the optical amplifier 6. The optical signals for respective channels are input to the optical multiplexing part 4 respectively as designated optical signal levels through the variable optical attenuation part 5. Then, the optical signals are multiplexed at the optical multiplexing part 4 and input to the optical amplifier 6. The variable optical attenuation part 5 controls the amount of attenuation against the optical signals corresponding to control signals from the optical level setting part 1. The variable optical attenuation part 5 may have various known structures. The optical signal that is multiplexed is amplified by the optical amplifier 6 and transmitted to the optical transmission path 7. The input optical signal power of the optical amplifier 6 is detected and the detected information is input to the setting protection part 3 so as to be shown as an AMP input power monitor.

The receiving part, namely the optical receiving device, includes the optical amplifier 8, the optical multiplex separation part 9, the transmission quality detecting part 10, the opto-electric conversion part 11, and the error detect correction part 12. The optical signal is amplified by the optical amplifier 8, de-multiplexed for respective channels namely wave lengths $\lambda_1$–$\lambda_n$ by the optical multiplex separation part 9, and input to the opto-electric conversion part 11. The opto-electric conversion part 11 is comprised of photo diodes or the like and converts the optical signal to an electric signal. The converted electric signal is input to the error detect correction part 12. The error detect correction part 12 reproduces data by level discernment and implements an error correction with an error correction mark so as to output as receiving data. The detected information such as a correction number during the above mentioned process is forwarded to the transmission quality detecting part 10. The transmission quality detecting part 10 transmits transmission quality information to the setting protection part 3 for respective channels by following a request for measuring from the transmitting part. The number of an error per unit time, an error ratio, the number of errors correction, a ratio of an error correction, or information of received optical signal level is used as the transmission quality information.

The request for measuring (REQ), completing of measuring (ACK), and transmission quality information and others are transmitted between the transmission quality detecting part 10 of the receiving part and the setting protection part 3 of the transmission part. For example, a means for transmitting the multiplexed optical signal that is amplitude-modulated at a low speed as a sub signal or a means for multiplexing the wave length of an optical signal having a different wave length from the main signal as a sub signal and transmitting in a case where the multiplexed optical signal is a main signal, or, a means for transmitting by applying to the overhead in a case where the main signal has a frame structure, is applied to these information. A means for receiving such the sub signal and separating from the main signal may have various known structures. In a case where a signal line is provided between the transmission part and the receiving part, it is possible to use the signal line as the above mentioned means.

The setting protection part 3 transfers the request for measuring (REQ) to the transmission quality detecting part 10 after a designated period or after a waiting time at the time of level change. Based on this, the transmission quality information for respective channels measured at the transmission quality detecting part 10 and the completing of measuring (ACK) are transferred to the setting protection part 3. Even if the transmission quality information exceeds a range of the transmission quality target, the setting protection part 3 does not transfer a request for setting in order to control the variable optical attenuation part 5. The setting protection part 3 transfers a request for setting in order to control the variable optical attenuation part 5 to the setting control part 2 in a case where the transmission quality information continues for the protection steps that are set.

The setting control part 2 transfers a designated value corresponding to channels following the request for setting of increase/decrease to the optical level setting part 1. The optical level setting part 1 converts setting values for respective channels to analog values by the DA converter (D/A ($\lambda_1$)–D/A($\lambda_n$)) so that the amount of attenuation for respective channels of the variable optical attenuation part 5 is controlled.

The setting control part 2 monitors the input optical power of the optical amplifier 6 showed as an AMP input power monitor that is input to the setting protection part 3. In a case where the input optical power exceeds the designated value, the variable optical attenuation part 5 of all channels are controlled all together irrespective of the number of the protection steps of backward protection and forward protection so that the input power of the optical amplifier 6 is decreased to the designated value. As a result of this, an obstacle to the optical amplifier 6 is prevented from occurring so that it is possible to avoid the reduction of the transmission quality of all of the channels.

The optical amplifiers 6 and 8, as described above, include the automatic level control (ALC) functions. A control structure by which an amplify output optical signal level is set for corresponding to the number of channel is known. It is desirable that the optical signal level for respective channels at the receiving part is between the designated maximum value and the minimum value. Hence, if the above mentioned optical signal level exceeds the maximum value or is less than the minimum value, the transmission quality declines. The setting control part 2 controls the variable optical attenuation part 5 at the receiving part based on the transmission quality information from the transmission quality detecting part 10 of the receiving part. For example, the optical signal level of a channel ($\lambda_1$) changes so as to become high, the optical signal levels of respective other channels ($\lambda_2$–$\lambda_n$) decrease relatively because the optical amplifiers 6 and 8 control to keep the amplified output optical level as multiplexed optical signals constant.

Thus, because of a change of the optical signal level of channels ($\lambda_2$–$\lambda_n$) other than the channel ($\lambda_1$), the optical signal level exceeding the maximum value or being less than the minimum value may occur If the optical signal whose optical signal level exceeds the maximum value or is less than the minimum value occurs secondarily, the transmission quality of the channel may decline. Hence, if a control of the optical signal level for respective channels at the transmission part is implemented based on the transmission quality information, the optical signal levels of other channels are changed like a chain reaction so that the control becomes unstable. Because of this, the setting protection part 3 is provided so that stable control can be achieved.

In a case where a control period of the ALC of the optical amplifier 6 of the receiving part is T [μs], the number of times of ALC control until it is determined that the amplified output optical signal level is stable is U [times], a measuring time at the transmission quality detecting part 10 of the receiving part is L [μs], time for transition of protection state is P [μs], and waiting time of request for measuring is S [μs], the number N of a forward protection step at the setting protection part 3 is satisfied with the followings.

$$N > T \times U/(L+P+R+S)$$

In this case, "(L+P+R+S)" is considered as a taking period of the transmission quality information. Furthermore, the maximum and minimum values of the setting value of a transmission quality target have margins.

In a case where maximum changing amplitude based on other channel settings is A [dB] and one step amplitude of optical output power setting is B [dB], a backward protection step M is satisfied with the followings.

$$M > A/B$$

Because of the number M of the backward protection step, a margin of M×B [dB] occurs against the maximum value or minimum value. It is possible to attempt stability of control by determining whether or not the request is made for setting the optical signal level based on a state transition by the forward protection N step and the backward protection M step.

Figure 2:
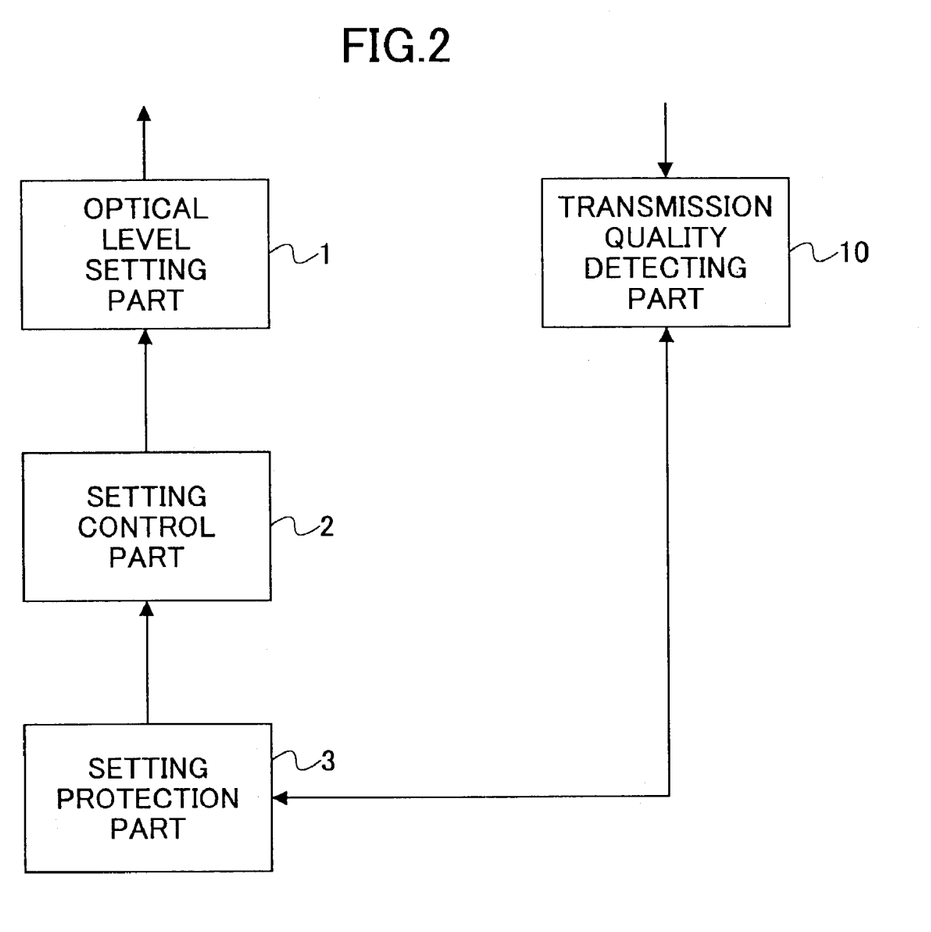
FIG. 2 is a view for explaining a main part of the present invention.

FIG. 2 is a view for explaining a main part of the present invention. FIG. 2 shows a transmission path of control information and others including the optical level setting part 1, the setting control part 2, the setting protection part 3, and the transmission quality detecting part 10. The transmission quality detecting part 10 transmits the transmission quality information for respective channels measured by following the request of the receiving part to the setting protection part 3. The setting protection part 3 sets the forward protection N steps and the backward protection M steps so as to prevent the optical signal levels of other channels from being controlled due to a change of an optical signal level of a channel. The setting protection part 3 decides whether or not the state transition occurs. In a case where the state transition occurs, the setting protection part 3 sends a notice to the setting control part 2, so that the setting control part 2 transmits optical output level setting information to the optical level setting part 1 and the optical level setting part 1 sets an optical signal output level of respective channels. Functions of the optical level setting part 1, the setting control part 2, and the setting protection part 3 can,be implemented by processing functions of a processor.

Figure 3:
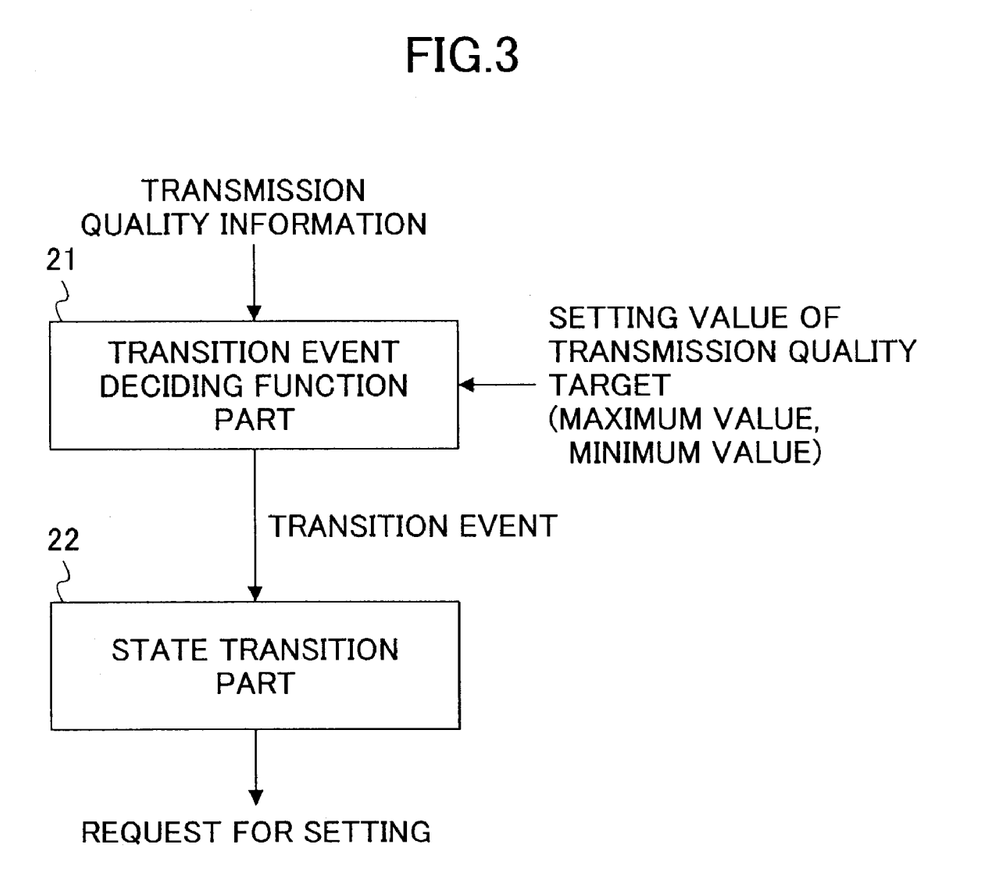
FIG. 3 is a view for explaining a setting protection part of the present invention.

FIG. 3 is a view for explaining a setting protection part of the present invention. A transition event deciding function part is numbered 21 and a state transition part is numbered 22. The transition event deciding function part 21 compares the transmission quality information for respective channels from the transmission quality detecting part 10 at the receiving part and the setting value of transmission quality target (maximum value, minimum value). A transition event corresponding to a result of the above comparison is provided to the state transition part 22. The state transition part 22 transmits a request for setting to the setting control part 2 based on the state transition of the number of protection steps of the forward protection N steps or the backward protection M steps.

Figure 4:
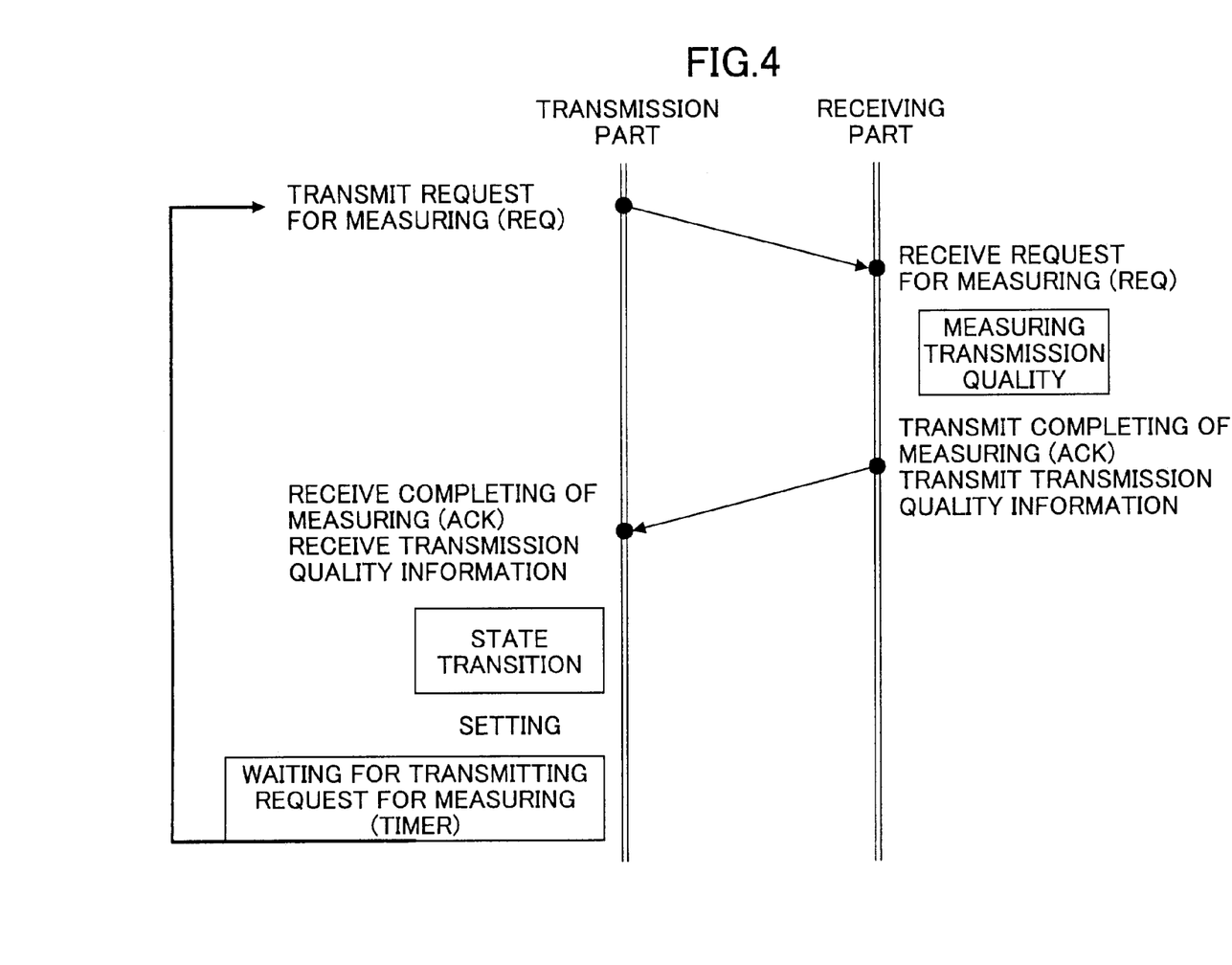
FIG. 4 is a view for explaining a forward sequence of transmission quality information.

FIG. 4 is a view for explaining a forward sequence of transmission quality information. FIG. 4 shows a sequence between the setting protection part 3 as the transmission part and the transmission quality detecting part 10 as the receiving part. When the receiving part receives the request for measuring (REQ) for respective channels from the transmission part, the receiving part measures the transmission quality of the channel that is designated and transmits the completing of measuring (ACK) and the transmission quality information of the result of measuring.

The transmission part receives the completing of measuring (ACK) and the transmission quality information. The transmission part makes the state transition based on a result of the comparison of the transmission quality information and the setting value of the transmission-quality target (maximum value, minimum value). In a case where the state transition corresponding to the protection step continues so that the request for setting to control the variable optical attenuation part 5 occurs, the setting for changing an amount of attenuation of the variable optical attenuation part 5 is implemented. In this case, a designated waiting for transmitting the request for measuring (TIMER) is implemented without transmitting the request for measuring of next channel immediately so that the next request for setting (REQ) is transmitted. Because of this, the optical signal level for channels at the receiving part changes based on the change of the amount of attenuation of the variable optical attenuation part 5. However, after the setting time of waiting for transmitting the request for measuring, the optical signal level becomes stable. Hence, even if an optical signal level of a channel is changed, a change of the optical signal level of other channels is not caused. Here, the request for setting (REQ) between the transmission part and the receiving part, the completing of measuring (ACK), and the transmission quality information are implemented by designating channels in order.

Figure 5:
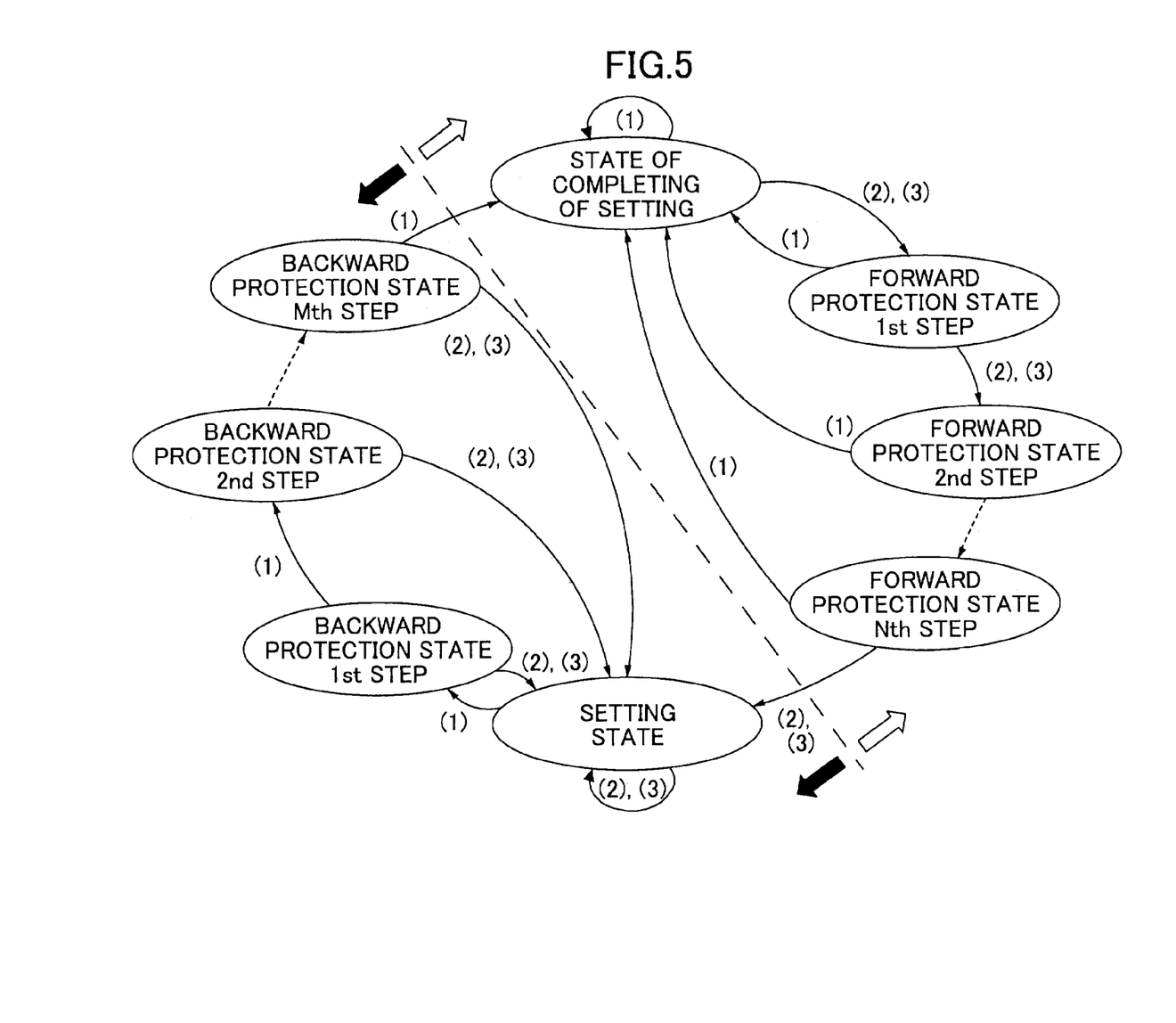
FIG. 5 is a view for explaining a state transition.

FIG. 5 is a view for explaining a state transition. FIG. 5 shows a setting state in which an amount of attenuation of the variable optical attenuation part 5 is changed, a completing state in which the setting is completed and protection states in which the state is transitioned between the setting state-and the completing state of setting. There are three kinds of transition events (transition events 1–3) as transition events of state transitions, satisfying the following conditions.

a. Transition event 1:
  Transmission quality information≧Setting value of transmission quality target (minimum value), and
  Transmission quality information≦Setting value of transmission quality target (maximum value)
b. Transition event 2:
  Transmission quality information>Setting value of transmission quality target (maximum value)
c. Transition event 3:
  Transmission quality information<Setting value of transmission quality target (minimum value)

That is, the transition event 1 shows a case where the transmission quality is in a target range of the transmission quality. The transition event 2 shows a case where the transmission quality exceeds the maximum value of the transmission quality target. The transition event 3 shows a case where the transmission quality is less than the minimum value of the transmission quality target. In FIG.5, the transition events 1–3 are numbered as (1)–(3) respectively. In FIG. 5, the side of the black arrow represents a state where there is a setting change and the side of the white arrow represents a state where there is not a setting change.

That is, in the setting state, in a case of the transition event 1, as shown by an arrow (1), transition to the first step of the backward protection state is implemented. In a case where next step is also the transition event 1, as shown by the arrow (1), transition to the second step of the backward protection state is implemented. After the transition event 1 continues, at the Mth step of the backward protection state, in a case of the transition event 1 again, as shown by the arrow (1), the state becomes the setting completing state. In a state of either of the 1st through the Mth steps of the backward protection state, when the transition event 2 or 3 occurs, as shown by arrow (2) or (3), transition to the first setting state is implemented. In a case where the state returns to the setting state, it is showed that the transmission quality is not stable in a target range of the transmission quality after the amount of the attenuation is changed by the variable optical attenuation part 5. After the transmission quality is stable, the transition to the setting completing state is implemented.

At the setting completing state, in a case where there is the transition event 2 or 3, as shown by the arrow (2) or (3), transition to the first step of the forward protection state is implemented. In a case where next step is also the transition event 2 or 3, transition to the second step of the forward protection state is implemented. After the transition event 2 or 3 continues and the transition to the Nth step of the forward protection state is implemented, in a case where there is the transition event 2 or 3, as shown by the black arrow, the transition to the setting completing state is implemented. In a case where the transition event becomes the transition event 1 in a state of 1st through Nth step of the forward protection state, the transition to the setting completing state is implemented. Request for setting occurs from setting state and a state of backward protection. No request for setting occurs from the setting completing state and a forward protection state.

Figure 6:
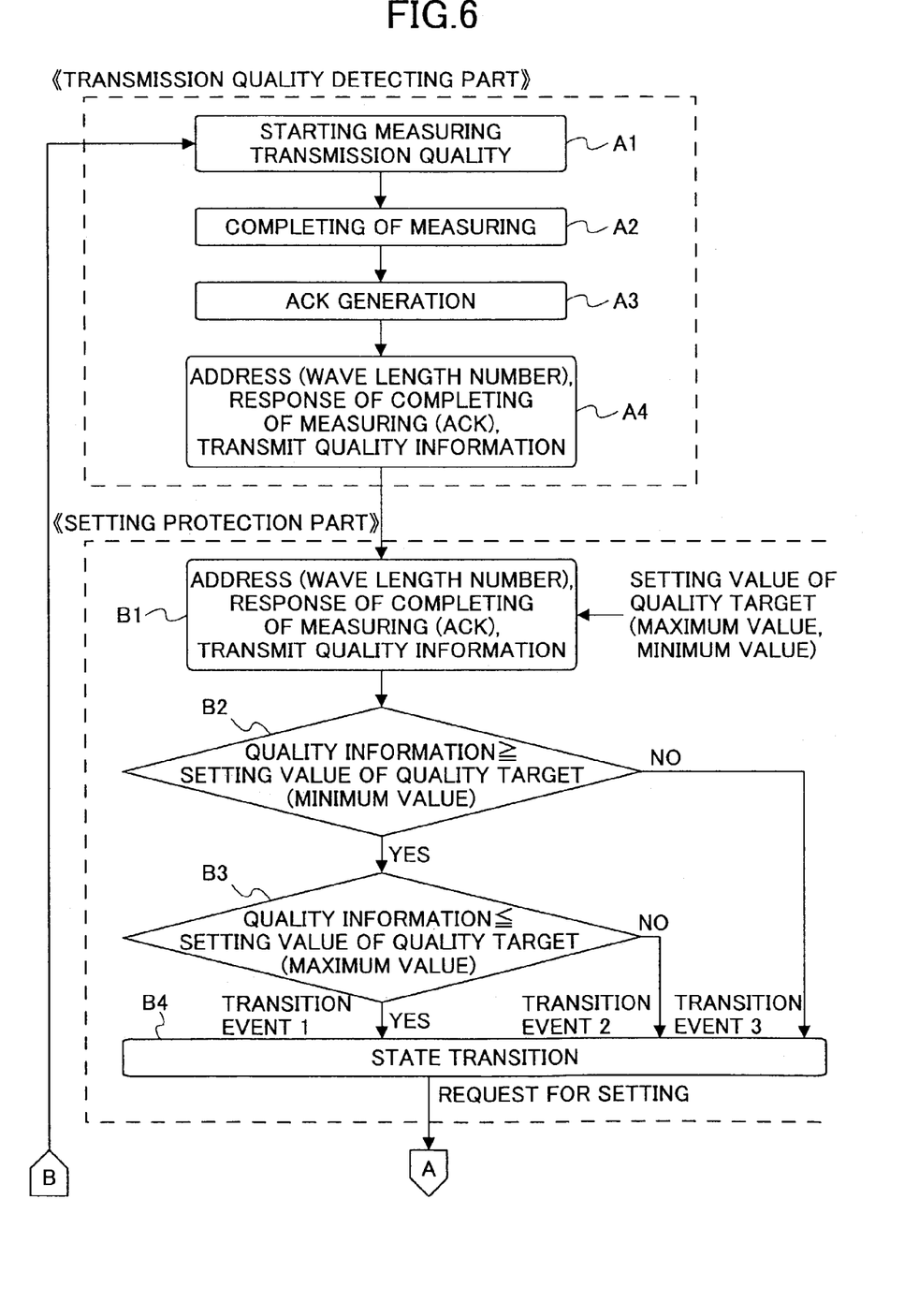
FIG. 6 is a flow chart of the embodiment of the present invention.
Figure 7:
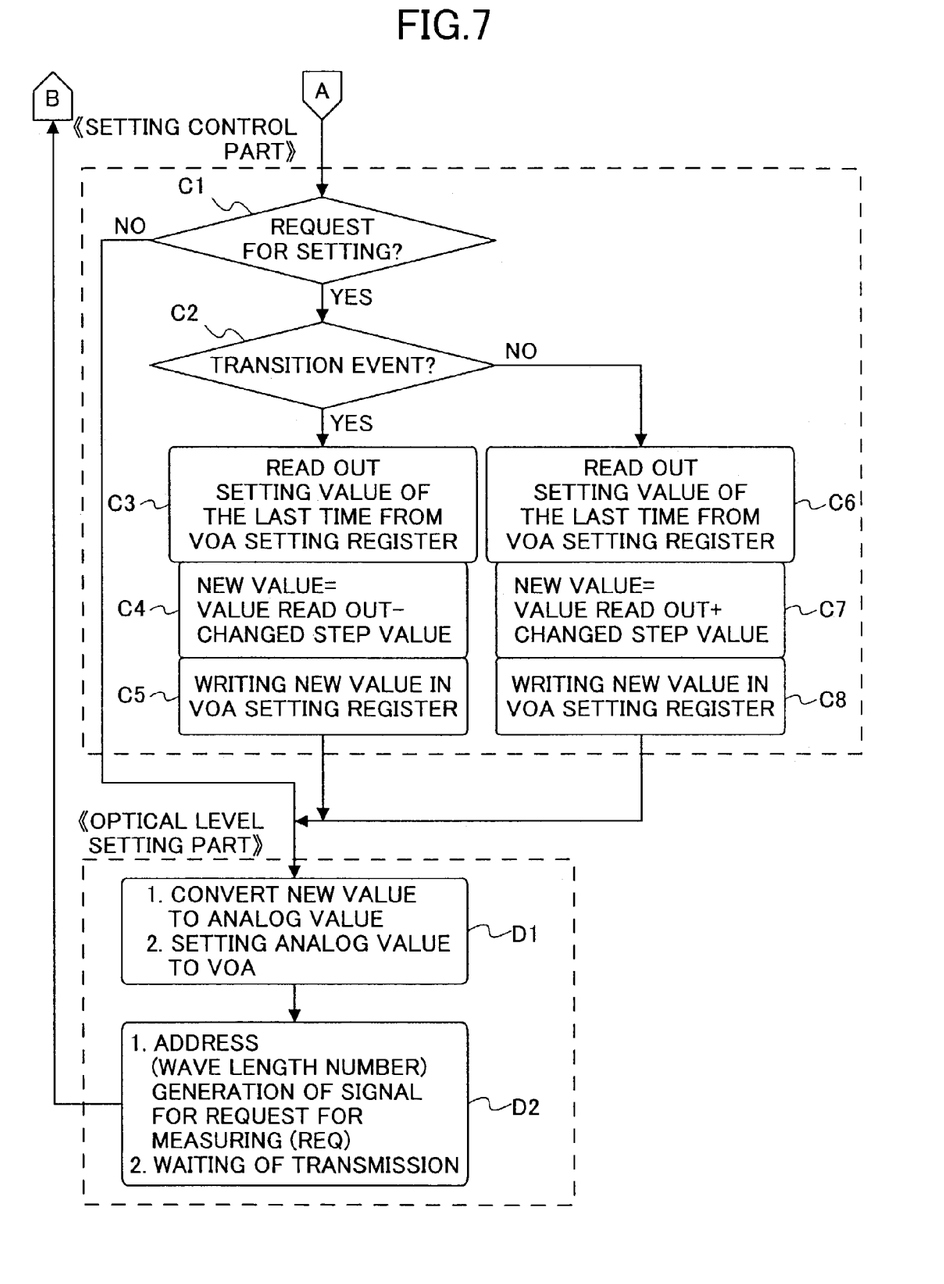
FIG. 7 is another flow chart of the embodiment of the present invention.

FIG. 6 is a flow chart of the embodiment of the present invention. FIG. 7 is another flow chart of the embodiment of the present invention. FIGS. 6 and 7 show process flow charts with respect to the optical level setting part 1, the setting control part 2, the setting protection part 3, and the transmission quality detecting part 10 shown in FIG. 1. At the transmission quality detecting part 10 of the receiving part, a transmission quality such as an error ratio of respective channels, an optical signal level or others starts being measured at starting measuring transmission quality (A1) which designates channels (wave lengths) from the transmission part. ACK generation (A3) of a responding signal is implemented after completing of measuring (A2). The transmission quality information is transmitted as showing an address (wave length number or channel number), response to completing of measuring (ACK) and a quality information transmission (A4).

At the setting protection part 3 of the receiving part, the transmission quality information is received as showing the address (wave length number or channel number) from the transmission quality detecting part 10, response to completing of measuring (ACK) and a quality information transmission (B1). At transition event deciding function part 21 of the setting protection part 3 (See FIG. 3), the following decision is implemented based on the setting value of quality target (maximum value, minimum value). That is, whether "transmission quality information≧Setting value of transmission quality target (minimum value)" is or not is decided (B2). In a case of "transmission quality information<Setting value of transmission quality target (minimum value)", the transition event 3 is given.

In a case of "transmission quality information≧Setting value of transmission quality target (minimum value)", whether or not "transmission quality information≦Setting value of transmission quality target (maximum value)" is decided (B3). In a case of "transmission quality information≦Setting value of transmission quality target (maximum value)", the transition event 1 is given. In a case of "transmission quality information>Setting value of transmission quality target (maximum value)", the transition event 2 is given. Based on the transition events 1–3, the state transition is implemented (B4). That is, if the state transition in directions of arrows of (1)–(3) in FIG. 5 and the request for setting generates, notification is sent to the setting control part 2.

At the setting control part 2, whether or not request for setting exists is decided (C1) (See FIG. 7). In a case where there is no request for setting, the process at the setting control part 2 is not implemented and the process at the optical level setting part 1 is implemented. In a case where there is the request for setting, whether or not there is the transition event 2 is decided (C2). In a case where there is the transition event 2, a received optical signal level is high. Hence it is necessary to reduce the optical signal level of the channel. Because of this, a setting value of the last time is read out from the variable optical attenuation part (VOA) setting register (C3). "New Value=Value Read Out+Changed Step Value" is calculated (C4). "New Value" is written in the VOA setting register (C5) and then the process at the optical level setting part 1 is implemented.

In a case where there is the request for setting and not the transition event 2, there is the transition level 3. In this case, a received optical signal level is low. Hence it is necessary to increase the optical signal level of the channel. Because of this, a setting value of the last time is, read out from the variable optical attenuation part (VOA) setting register (C6). "New Value=Value Read Out+Changed Step Value" is calculated (C7). "New Value" is written in the VOA setting register and then the process at the optical level setting part 1 is implemented (C8).

At the optical level setting part 1, "New Value" set in the VOA setting register is converted to an analog value, and the analog value is set to the VOA that is an analog control signal controlling the amount of attenuation of the variable optical attenuation part 5 is input to the VOA (D1). And then, the address (wave length number), channel number, or signal for request for measuring (REQ) is regenerated and the transmission is waited (D2). The transmission is waited so as to delay the following starting measuring transmission quality (A1) by a timer or the like. That is, an amount of the variable optical attenuation part (VOA) of the channel is controlled to be changed by setting the new value at the VOA setting register. Hence, the optical signal level of the channel is changed so that the optical signal level of other channels is influenced. The transmission is waited in order to avoid an unstable period during the changing process and start measuring of the transmission quality at the receiving part.

Figure 8:
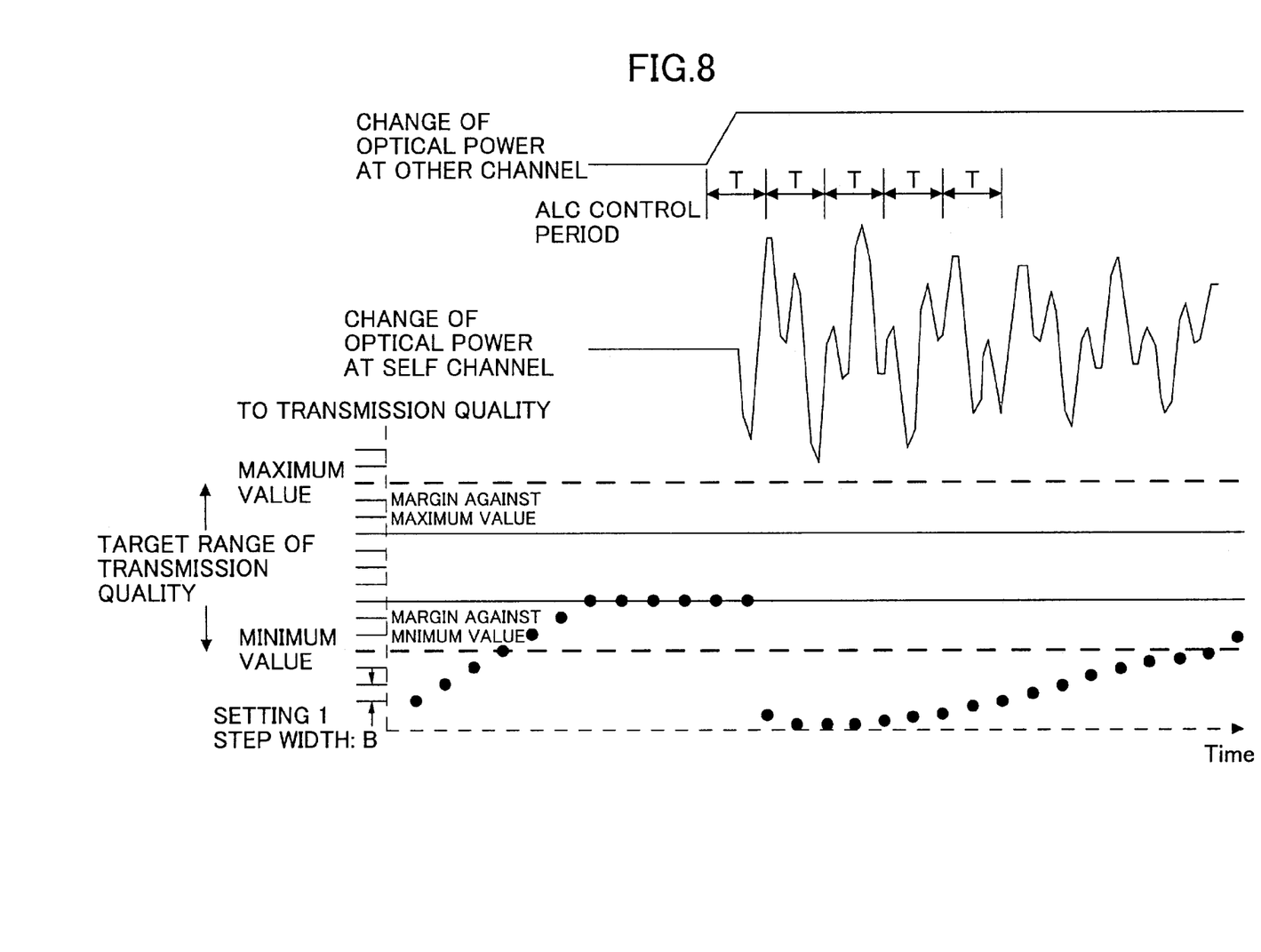
FIG. 8 is a view for explaining an action in a case where there is no setting protection function.

FIG. 8 is a view for explaining an action in a case of no setting protection function. FIG. 8 shows a relation of a change of the optical power at another channel, a change of the optical power at the self channel, and the transmission quality. In FIG. 8, T represents an ALC control period. FIG. 8 also shows a range, a maximum value and a minimum value of a transmission quality target, a setting step width B and the transmission quality represented by black dots. The optical signal level is controlled by the optical amplifier at every ALC control period T. In a state where the transmission quality of the self channel is stable in a target range of the transmission quality, when the optical power of the other channel is changed, the optical amplifier is amplify-operated so that the optical signal level is stable at every ALC control period T.

In this case, if the optical signal power of the other channel is increased, the whole of the optical signal level is controlled to be increased by the ALC control of the optical amplifier so that the optical signal level of the self channel is decreased. As a result of this, the transmission quality of the self channel is decreased to less than the minimum value of the target range of the transmission quality, and the optical signal level of the self channel prior to the optical multiplex is increased. Although the optical signal level is optical-multiplexed because of increase of the optical signal level of the self channel, the optical signal level is controlled to become stable by the ALC control of the optical amplifier. As a result of this, the transmission quality of the other channel is further decreased and becomes less than the minimum value. By repeating the above mentioned process, time for becoming stable becomes long so as to show the optical power change of the self channel.

Figure 9:
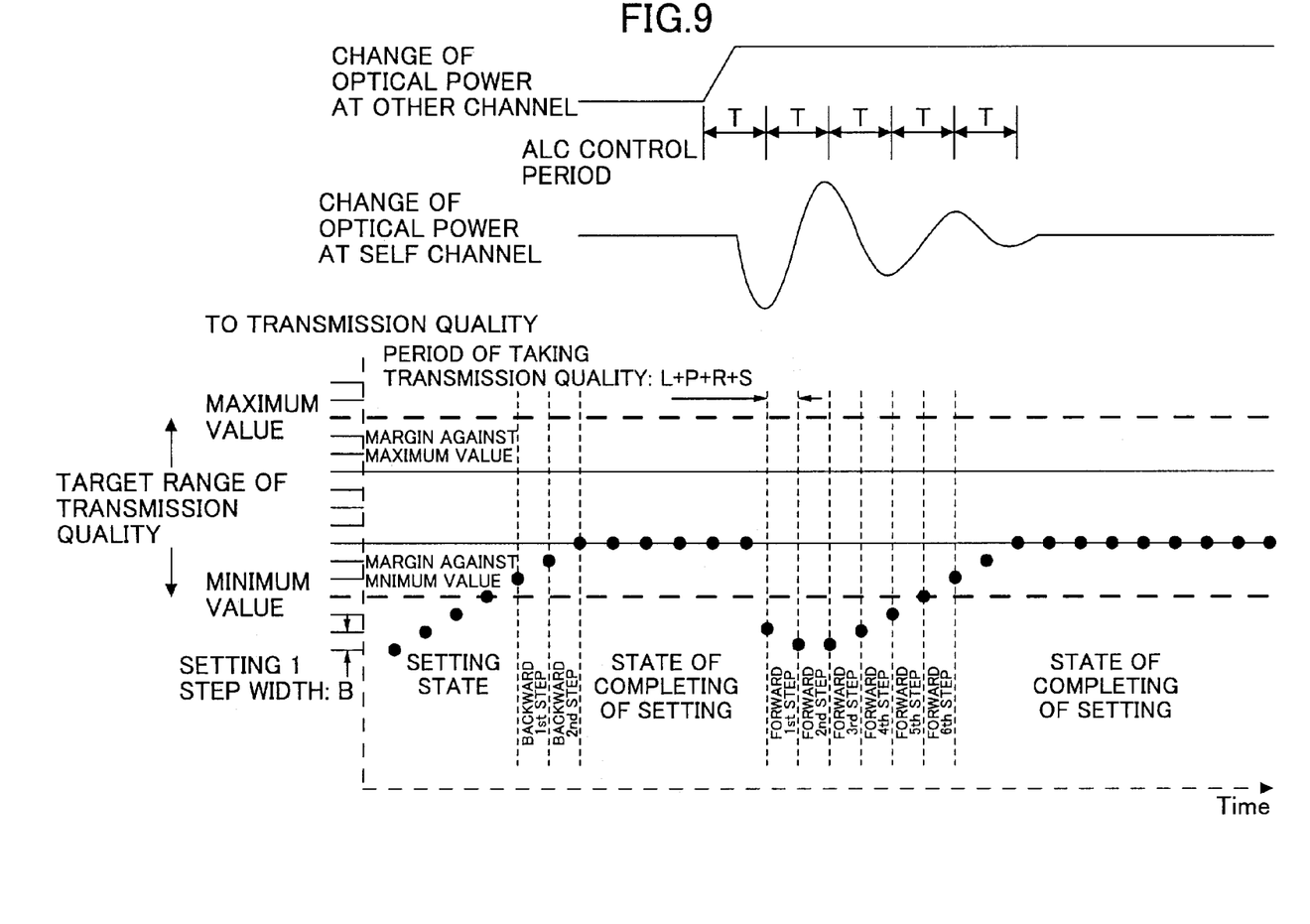
FIG. 9 is a view for explaining an action in a case where there is a setting protection function.

FIG. 9 is a view for explaining an action in a case of the setting protection function. In a case where the step numbers M of the backward protection is 2 and the step numbers N of the forward protection is 6 at the setting protection part 3 (See FIG. 1) and the number of periods of taking transmission quality is (L+P+R+S), the number of periods of taking transmission quality may be changed because the number of periods of taking transmission quality includes waiting time S of a request for measuring. For example, the transition event 1 continues from the setting state at every period of taking transmission quality so that the state is transitioned from the state of the backward 2nd step to the state of completing of setting so that the state becomes stable.

In this state, when the optical power of another channel is changed and the optical power of the self channel is influenced so that the transmission quality exceeds the target range of the transmission quality, the transition event 2 or 3 continues. In this case, the state of completing of setting continues until the forward protection step number becomes 6. In a case where the change of the optical power of the self channel becomes small, the transition event 2 or 3 does not occur so that the transition to the state of completing of setting is implemented. In a case where the transition event 2 or 3 occurs continuously, the transition to the setting state is implemented. In a case of the transition 2, the request for setting for reducing the optical signal level is transmitted. In a case of the transition 3, the request for setting for increasing the optical signal level is transmitted so that the control at the variable optical attenuation part of the self channel is implemented.

Therefore, since N steps of the forward protection step number are set, the control of the optical signal level at the self channel is not implemented at every change of the transmission quality against the change of the optical signal power at other channel. The control for setting is not implemented until the transition event 3 or the transition event 2 of the forward protection Nth step continues generating. Hence, it is possible to reduce time for becoming stable against the change of the optical power at other channels by reducing the change of the optical power of other channels including the self channel. In addition, because of setting the protection number of M of the backward protection, if the transition event 2 or 3 is generated during the transition from the setting state to the state of completing of setting, the request for setting is generated and the control for changing the amount of attenuation of the variable optical attenuation part 5 is implemented.

The setting control part 2 of the transmission part (the optical transmission device) controls the variable optical attenuation part 5 as corresponding to the transmission quality at every channel based on the result of the input power monitor of the optical amplifier 6 so as to control the levels of the optical signal of the respective wave lengths prior to multiplexing. Based on the result of the input power monitor of the optical amplifier 6, if an input level of the optical amplifier 6 that exceeds the designated level is controlled to reduce by controlling the variable with optical attenuation part 5, it is possible to control the setting control part 2 for some time by the setting protection part 3 so as to prevent the level control based on the transmission quality. In this case, it is desirable that the setting protection part 3 controls the setting control part 2 for a time more than a convergent time of an automatic level control such as a time provided by a timer or a time corresponding to the protection steps by which the control to follow the transmission quality information until the transmission quality information is received plural times. Because of this, it is possible to avoid having the level control frequently based on the transmission quality due to decrease of the level at the respective channels for making the input level of the optical amplifier 6 low.

The present invention is not limited to these embodiments, but variations and modifications may be made without departing from the scope of the present invention. For example, the information of the channel number is added to the optical amplifiers 6 and 8 and the optical signal level corresponding to the channel number can be amplified in the present invention.

As described above, in the optical multiplex communication system or the control method of optical multiplex communication, when the change of the optical signal level of one channel gives an influence to an optical signal level of another channel, the protection step number is set at the setting protection part 3. In addition, the state transition is implemented based on the comparative decision of the transmission quality information from the transmission quality detecting part 10 and the setting value of the transmission quality target. When a direction of the state transition continues for the step numbers of the protection that is set, the setting to control the increase or decrease of the attenuation by the variable optical attenuation part 5 is implemented. The present invention has an advantage in that the control of the optical signal level at another channel continues against momentary change of the optical signal level of a channel so that the state goes back to a stable state within a short time. Furthermore, the optical signal level is controlled stably in turn against the channel whose transmission quality declines, so that the optical signal has the setting value of the transmission quality target.

This patent application is based on Japanese priority patent application No. 2002-030313filed on Feb. 7 2002, the entire contents of which are hereby incorporated by reference.

What is claimed is:

1. An optical multiplex communication system comprising a transmission part and a receiving part,
   wherein optical signals having different wavelengths and respectively assigned to a plurality of channels are multiplexed so as to make multiplexed signals, and then amplified by an optical amplifier and transmitted to an optical transmission path, by the transmission part;
   the multiplexed optical signals are received through the optical transmission path and then amplified by another optical amplifier and de-multiplexed for respective channels so that a receiving process is implemented by the receiving part;
   the receiving part includes a transmission quality detecting part that measures and transmits transmission quality information for the channels based on a request from the transmission part;
   the transmission part includes a variable optical attenuation part controlling the optical signal level for the channels, an optical level setting part controlling the variable optical attenuation part based on a setting value, a setting control part adding the setting value to the optical level setting part based on a request for setting, and a setting protection part transmitting the request for setting to the setting control part; and
   the setting protection part sets a protection step number with respect to a state transition transmitting the request for setting so as to make the transmission quality information be in a target range of the transmission quality.

2. The optical multiplex communication system as claimed in claim 1, wherein the setting protection part of the transmission part includes:
   a transition event deciding function part that outputs a transition event corresponding to a result of a decision of whether or not the transmission quality information is in the target range of the transmission quality; and a state transition part that sets a setting state requesting for setting a state against the optical level setting part, a setting completing state in which the setting is completed, a step number of a backward protection that transitions from the setting completing state to the setting state so that the state is transitioned by the transition event.

3. The optical multiplex communication system as claimed in claim 2, wherein the setting protection part of the transmission part transmits the request for measuring against the transmission quality detecting part and, after a designated waiting time, the request for setting is transmitted to the setting control part.

4. The optical multiplex communication system as claimed in claim 2, wherein the setting control part of the transmission control part sets a value of a changing step value added/subtracted to/from a present setting value of the optical level setting part, at the optical level setting part, based on the request for setting of an increase/decrease from the setting protection part.

5. The optical multiplex communication system as claimed in claim 2, wherein the variable optical attenuation part is controlled for the channels through the setting control part by the optical level control setting part based on detected information showing that the input power of the optical amplifier exceeds the setting value so that the input power is controlled so as to become less than a designated value.

6. The optical multiplex communication system as claimed in claim 1, wherein the setting protection part of the transmission part transmits the request for measuring against the transmission quality detecting part after a designated waiting time when the request for setting is transmitted to the setting control part.

7. The optical multiplex communication system as claimed in claim 6, wherein the setting control part of the transmission control part sets a value of a changing step value added/subtracted to/from a present setting value of the optical level setting part, at the optical level setting part, based on the request for setting of an increase/decrease from the setting protection part.

8. The optical multiplex communication system as claimed in claim 1, wherein the setting control part of the transmission control part sets a value of a changing step value added/subtracted to/from a present setting value of the optical level setting part, at the optical level setting part, based on the request for setting of an increase/decrease from the setting protection part.

9. The optical multiplex communication system as claimed in claim 1, wherein the variable optical attenuation part is controlled for the channels through the setting control part by the optical level control setting part based on detected information showing that the input power of the optical amplifier exceeds the setting value so that the input power is controlled so as to become less than a designated value.

10. An optical transmission device in which optical signals having a different plurality of wave lengths are multiplexed, amplified by an optical amplifier having an output level stability function, and transmitted, comprising:
a setting control part that level-controls respective un-multiplexed optical signal having the plurality of wave length corresponding to the transmission quality at every the plurality of the wave lengths as a result of measuring of a receiving device that receives the optical signal, and controls to decrease the level of the un-multiplexed optical signals having the plurality of wave length in a case where the input level of the optical amplifier exceeds a designated level, and
a setting protection part that controls so as to prevent the setting control part from level-controlling based on the transmission quality.

11. A control method of optical multiplex communication, wherein a multiplexed optical signal is transmitted between a transmission part and a receiving part; optical signals having different wavelengths and respectively assigned to a plurality of channels are multiplexed by controlling an optical signal level corresponding to the channel with a variable optical attenuation part so as to make the multiplexed signals, and then amplified with an optical amplifier and transmitted to an optical transmission path, by a transmission part;
the multiplexed optical signals are received through the optical transmission path and then amplified with another optical amplifier and de-multiplexed for respective channels so that transmission quality for the channels is detected with the transmission quality detecting part, by a receiving part,
comprising the steps of:
a) receiving the transmission quality information corresponding to the channels from the transmission quality detecting part of the receiving part by a setting protection part of the transmitting part, and
b) transitioning a state corresponding to a step number of the protection between a setting state in which the setting of the amount of the attenuation of the variable optical attenuation part is changed and a setting completing state in which the setting is completed based on a result of a decision of whether or not the transmission quality information is in a target range of the transmission quality.

12. The control method of optical multiplex communication as claimed in claim 11, further comprising the steps of:
c) comparing and determing the transmission quality information that the setting protection part of the receiving part receives from the transmission quality detecting part and the setting value of the transmission quality target range;
d) transitioning the setting state in which the request for setting is transferred when a transition event 2 or a transition event 3 continues from the setting completing state of the amount of the attenuation of the variable optical attenuation part for step numbers of forward protection; and
e) transitioning to the setting completing state when a transition event 1 continues from the setting state for step numbers of backward protection,
wherein the transition event 1 is a case where the transmission quality is between the maximum value and the minimum value of the setting value of the transmission quality target range, the transition event 2 is a case where the transmission quality exceeds the maximum value of the transmission quality target range, and the transition event 3 is a case where the transmission quality is less than the minimum value of the transmission quality target range.

13. The control method of optical multiplex communication as claimed in claim 12, further comprising the step of:
f) transmitting a request for measuring the transmission quality against the transmission quality detecting part of the receiving part after a designated waiting time of the transmission of the request for measuring following the change of setting of increase or decrease of the amount of attenuation of the variable optical attenuation part.

14. The control method of optical multiplex communication as claimed in claim 12, further comprising the step of:
   g) controlling input power of the amplifier of the receiving part so that the input power becomes less than a designated value by making the optical level setting part control the variable optical attenuation part for the channels simultaneously based on detected information showing that the input power exceeds the designated value irrespective of the protection number of the setting protection part.

15. The control method of optical multiplex communication as claimed in claim 11, further comprising the step of:
   f) transmitting a request for measuring the transmission quality against the transmission quality detecting part of the receiving part after a designated waiting time of the transmission of the request for measuring following the change of setting of increase or decrease of the amount of attenuation of the variable optical attenuation part.

16. The control method of optical multiplex communication as claimed in claim 15 further comprising the step of:
   g) controlling input power of the amplifier of the receiving part so that the input power becomes less than a designated value by making the optical level setting part control the variable optical attenuation part for the channels simultaneously based on detected information showing that the input power exceeds the designated value irrespective of the protection number of the setting protection part.

17. The control method of optical multiplex communication as claimed in claim 11, further comprising the step of:
   g) controlling input power of the amplifier of the receiving part so that the input power becomes less than a designated value by making the optical level setting part control the variable optical attenuation part for the channels simultaneously based on detected information showing that the input power exceeds the designated value irrespective of the protection number of the setting protection part.

* * * * *

UNITED STATES PATENT AND TRADEMARK OFFICE
CERTIFICATE OF CORRECTION

| | | |
|---|---|---|
| PATENT NO. | : 7,092,638 B2 | Page 1 of 1 |
| APPLICATION NO. | : 10/269980 | |
| DATED | : August 15, 2006 | |
| INVENTOR(S) | : Yoshihisa Funami et al. | |

It is certified that error appears in the above-identified patent and that said Letters Patent is hereby corrected as shown below:

Title Page, Item (56) Foreign Patent Documents, change "5/2001" to --2/2001--.

Column 14, Line 38, change "determing" to --determining--.

Signed and Sealed this

Third Day of April, 2007

JON W. DUDAS
*Director of the United States Patent and Trademark Office*